US007155479B2

(12) United States Patent
Cover et al.

(10) Patent No.: US 7,155,479 B2
(45) Date of Patent: Dec. 26, 2006

(54) INCREASING THE LEVEL OF AUTOMATION WHEN CONFIGURING NETWORK SERVICES

(75) Inventors: Steven A. Cover, Redmond, WA (US);
Chad M. Whitney, Seattle, WA (US);
Bryan T. Starbuck, Duvall, WA (US);
Chee H. Chew, Redmond, WA (US);
Yu Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 827 days.

(21) Appl. No.: 10/060,489

(22) Filed: Jan. 30, 2002

(65) Prior Publication Data
US 2003/0145067 A1 Jul. 31, 2003

(51) Int. Cl.
*G06F 15/16* (2006.01)
(52) U.S. Cl. ...................................................... 709/203
(58) Field of Classification Search ................ 709/220, 709/223
See application file for complete search history.

(56) References Cited
U.S. PATENT DOCUMENTS

| | | | | |
|---|---|---|---|---|
| 6,230,195 | B1 * | 5/2001 | Sugawara et al. | 709/220 |
| 6,289,377 | B1 * | 9/2001 | Lalwaney et al. | 709/222 |
| 6,801,920 | B1 * | 10/2004 | Wischinski | 707/203 |

OTHER PUBLICATIONS

Facilitating Netscape in a Public PC Lab for a Mobile Student Population, D. Mojta, SIGUCCS '99. User Services Conference for University and College Computing Service Organizations Proceedings, Publ. by ACM, New York, NY, USA, 1999, p. 232.

Is This Lan's End? (LAN-Based E-Mail: Limitations), T. Wright, PC Pro, Publ. in United Kingdom, No. 2, Dec. 1994, pp. 279-281.

Structured Design of a Knowledge-Based Message Dissemination System, K. Higa, International Journal of Software Engineering and Knowledge Engineering, Publ. in Singapore, vol. 4, No. 1 Mar. 1994, pp. 61-80.

* cited by examiner

*Primary Examiner*—David Y. Eng
(74) *Attorney, Agent, or Firm*—Workman Nydegger

(57) ABSTRACT

A requesting computer system accesses an identifier, which is representative of services (e.g. electronic mail or news groups provided over a network) that will be consumed by consumer modules included in a consuming computer system. The identifier may be received at a configuration computer system that contains configuration information associated with the consumer modules. Receiving the identifier causes a search of the configuration information contained in the configuration computer system. As a result of the search, the configuration computer system may identify configuration information associated with the network services that will be consumed. A configuration computer system may identify configuration information associated with itself or other external services providers. The configuration computer system causes the identified configuration information to be sent to the consuming computer system. The modules that consume the services may automate entry of configuration information to reduce the manual entry of the configuration information.

44 Claims, 5 Drawing Sheets

INCREASING THE LEVEL OF AUTOMATION WHEN CONFIGURING NETWORK SERVICES

BACKGROUND OF THE INVENTION

1. The Field of the Invention

The present invention relates to increasing the level of automation when configuring network services. More specifically, the present invention relates to systems, methods, and computer program products that increase automation when providing and receiving configuring information associated with network services.

2. Background and Relevant Art

Networked computer systems, such as Internet-connected computer systems, often use a variety of network services. These networked computer systems may use network services such as electronic mail, news groups, and World Wide Web ("Web") content. Such network services are utilized to share data electronically between networked computer systems. This is beneficial since transporting data electronically is often much faster than other available methods.

However, for a computer system to effectively utilize network services, the computer system must be properly configured. Configuring a computer system to use a network service often requires a user to manually enter multiple configuration parameters that are associated with the network service. For example, when configuring electronic mail, a user may need to manually enter the identity of an incoming electronic mail server, an outgoing electronic mail server, an electronic mail domain, a type of electronic mail, a username, and a password. As a result, a lack of technical expertise in knowing these configuration parameters may discourage, or even prevent, a user from being able to use electronic mail.

Even if a user is aware of the configuration parameters associated with a network service, an error may occur when the parameters are manually entered. Errors in manual entry may include misspelling a word, failing to capitalize certain characters, or entering extraneous characters. The chance of an error occurring during manual entry of configuration parameters is greatly increased on a mobile computer system that has limited input capabilities. Incorrectly entered configuration parameters may result in network services and/or computer systems malfunctioning or otherwise not operating as intended. Additionally, even when entered correctly, the manual entry of configuration parameters on a mobile computer system with limited input capabilities may be time consuming.

One solution to the problem of configuring network services has been to access a central server to retrieve configuration parameters associated with network services. To access a central server, a user would manually enter the address of the central server. Additionally, a user may need to manually enter authorization information, such as a username and password, to be granted access to configuration parameters contained in the central server. For example, to configure electronic mail, a user of a computer system may manually enter the address of a central server that utilizes the Lightweight Directory Access Protocol ("LDAP"). The user may enter a username and password to gain access to electronic mail parameters contained in the central server. The user may then select that electronic mail parameters be transferred to the computer system.

Accessing a central server is beneficial because a single username and password may facilitate access to configuration parameters for multiple network services. However, this method does not completely eliminate the requirement of manually entering configuration parameters to configure network services. A user wishing to configure network services may often enter at least three different authorization parameters, an address to the central server, a username, and a password. Lack of knowledge of any of the authorization parameters or an error in entering any of the authorization parameters may result in not being able to retrieve configuration parameters for network services.

Some central servers are configured so that network service configuration parameters may be accessed without entering authorization information. This further reduces the chance of an error occurring in manual entry, as a user need enter only the central server address. However, even if a user gains access to a central server, the user may be required to select the appropriate configuration parameters and initiate a download to retrieve the configuration parameters. Lack of technical knowledge may prevent a user from selecting or downloading the correct configuration parameters. Retrieving incorrect configuration parameters (or retrieving no parameters at all) may cause network services and/or a computer system to malfunction or not operate as intended.

Therefore, what are desired are systems, methods, and computer program products for increasing the level of automation when providing and receiving configuring information associated with network services.

BRIEF SUMMARY OF THE INVENTION

The principles of the present invention provide for increasing the level of automation when requesting and providing configuring information associated with network services. A requesting computer system accesses an identifier that is representative of network services that will be consumed by modules included in a consuming computer system. The requesting computer system may be the same as or different from the consuming computer system. If it is the same, then the requesting computer system contains the actual modules that consume the network services.

The identifier is received at a configuration computer system that contains configuration information associated with the network services that will be consumed. In response to receiving the identifier, the configuration computer system automatically causes the transport of configuration information to the consuming computer system. The consuming computer system uses the configuration information to configure the modules that consume network services.

Accessing an identifier may include accessing one or more portions of an electronic mail address. For example, an identifier may include a complete electronic mail address, such as "jdoe@test.com" or may include only portions of the electronic mail address, such as "test.com" The electronic mail address may be associated with a consuming computer system. A requesting computer system may generate an identifier by converting one or more portions of an electronic mail address into a Uniform Resource Identifier ("URI"). In some cases, an identifier may be automatically generated in response to a user entering an electronic mail address.

The requesting computer system, automatically, without user intervention, causes a search for configuration information associated with services that will be consumed. A search may be caused by the requesting computer system pushing an identifier, such as one or more portions of an electronic mail address, to a configuration computer system that includes configuration information for network services.

A service provider that manages the configuration computer system may be aware that a received identifier is representative of one or more network services that will be consumed by modules included in the consuming computer system. When an identifier is a URI, a search may be caused by accessing a configuration computer system that is referenced by the URI.

The configuration information resulting from the search is accessed. This may include a consuming computer system receiving the configuration information. Accessed configuration information may or may not be associated with a configuration computer system that transports the configuration information. For example, a configuration computer system may include configuration information for network services that are not provided by the configuration computer system. Likewise, the configuration computer system that sends configuration information to a consuming computer system may or may not be the computer system that initially received an identifier. An identifier may be redirected from one or more remote computer systems to a configuration computer system that contains configuration information for network services.

The modules that consume the services receive the accessed configuration information. This may include a consuming computer system automatically populating fields in a form, which would otherwise be populated by manual entry of configuration information.

From a server perspective, a configuration computer system automatically transports network service configuration information. This includes a configuration computer system receiving a request for configuration information associated with one or more network services. A received request may include receiving an identifier in the form of one or more portions of an electronic mail address. A received request may also include accessing a URI associated with the configuration computer system.

The configuration computer system, automatically, and without user intervention, identifies configuration information associated with the one or more services. This may include the configuration computer system identifying configuration information for network services that are provided by the configuration computer system. However, it may be that the configuration computer system contains configuration information for network services that are provided external service providers. In these cases, the configuration computer system may include a table of configuration information for configuring services provided by external service providers. When a request is received, the configuration computer system may automatically search the table to identify the appropriate configuration information. The configuration computer system then causes the identified configuration information to be sent to the consuming computer system.

Thus, a single piece of information, such as an electronic mail address, may facilitate the automatic configuration of modules that consume network services. Automatic configuration reduces the technical knowledge that is needed to correctly configure such modules. Automatic configuration also reduces the amount of configuration information that is manually entered when configuring such modules. These factors, in turn, increase the chance that network services will be configured correctly.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
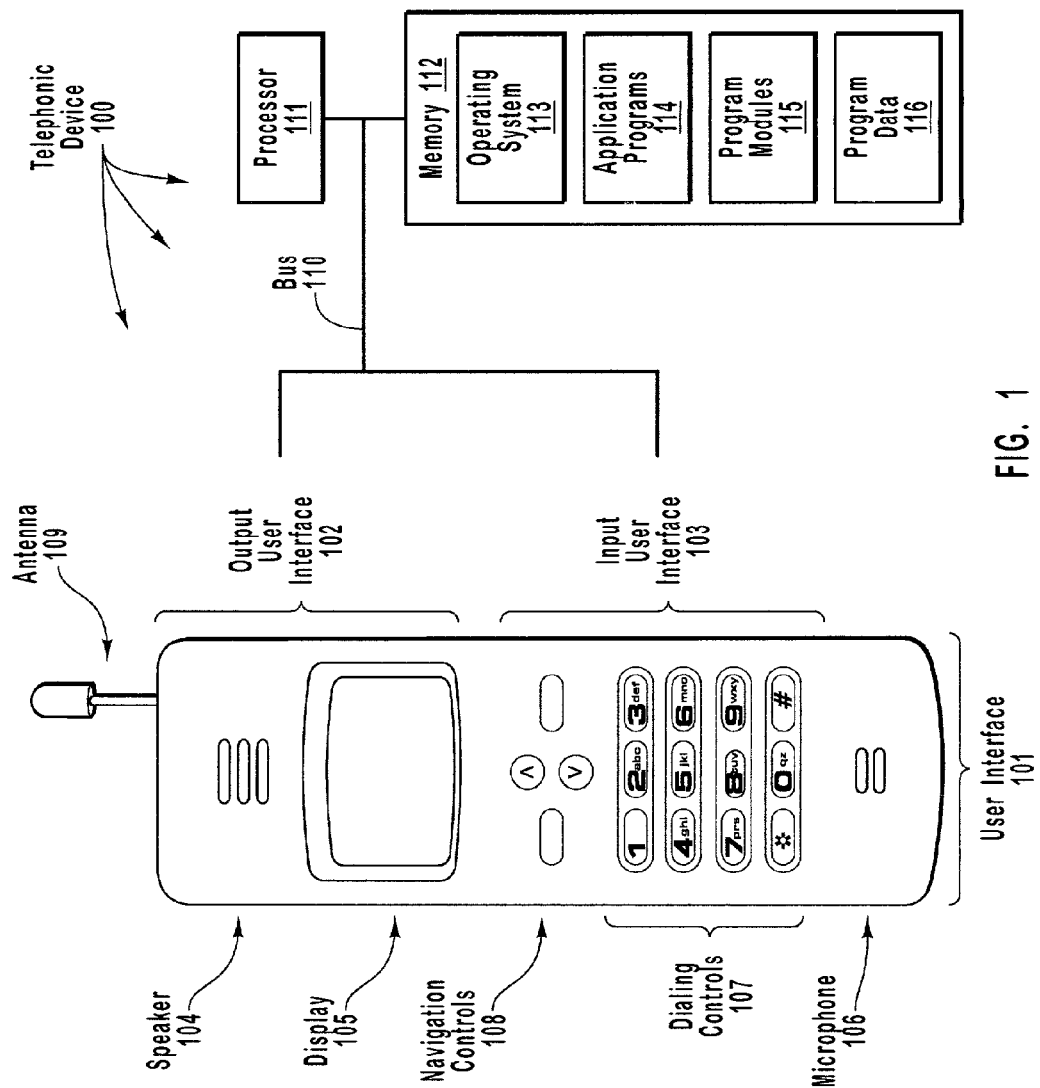
FIG. 1 illustrates an example of a telephonic device that provides a suitable operating environment for the present invention.

The present invention extends to systems, methods, and computer program products that increase the level of automation when sending and receiving configuration information for modules that consume network services. A configuration computer system receives a request from a requesting computer system, requesting that configuration information be sent to modules included in a consuming computer system. The requesting computer system may be the same as or different from the consuming computer system. If it is the same, then the requesting computer system contains the actual modules that consume the network services.

A request may include a simple identifier that is used to represent network services that will be consumed by modules of the consuming computer system. An identifier may be generated using a single piece of information, such as an electronic mail address. In response to receiving the identifier, the configuration computer system automatically identifies appropriate configuration information for modules that consume network services. The configuration information is received at the consuming computer system and modules that consume network services may be configured using the received configuration information.

The embodiments of the present invention may comprise a general-purpose or special-purpose computer system including various computer hardware components, which are discussed in greater detail below. Embodiments within the scope of the present invention also include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions or data structures and which may be accessed by a general-purpose or special-purpose computer system.

When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including personal computers, laptop computer, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a telephonic device 100. The telephonic device 100 includes a user interface 101 for allowing a user to input information through an input user interface 103, and to review information presented via an output user interface 102. For example, the output user interface 102 includes a speaker 104 for presenting audio information to the user, as well as a display 105 for presenting visual information to the user. The telephonic device 100 may also have an antenna 109 if the telephonic device 100 has wireless capabilities.

The input user interface 103 may include a microphone 106 for translating audio information into electronic form. In addition, the input user interface 103 includes dialing controls 107 represented by 12 buttons through which a user may enter information. Input user interface 103 also includes navigation control buttons 108 that assist the user in navigating through various entries and options listed on display 105.

Although user interface 101 has the appearance of a mobile telephone, the unseen features of user interface 101 may allow for complex and flexible general-purpose processing capabilities. For example, telephonic device 100 also includes a processor 111 and a memory 112 that are connected to each other and to the user interface 101 via a bus 110. Memory 112 generally represents a wide variety of volatile and/or non-volatile memories and may include types of memory previously discussed. However, the particular type of memory used in telephonic device 100 is not important to the present invention. Telephonic device 100 may also include mass storage devices (not shown) similar to those associated with other general-purpose computer systems.

Program code means comprising one or more program modules may be stored in memory 112 or other storage devices as previously mentioned. The one or more program modules may include an operating system 113, one or more application programs 114, other program modules 115, and program data 116.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In this description and in the following claims, a "consumer module" is defined as one or more software modules, one or more hardware modules, or a combination thereof, that may be configured to consume services provided by as service provider. Examples of consumer modules include electronic mail client modules, news group reader modules and Web browser modules. However, consumer modules are not limited to the present examples. It would be apparent to one skilled in the art, after having reviewed this description, that a wide variety of modules that operate in a networked environment may consume services that are provided by a service provider.

In this description and in the following claims, a "provider module" is defined as one or more software modules, one or more hardware modules, or a combination thereof, that provide and/or forward configuration information associated with services.

In this description and in the following claims, a "logical communication path" is defined as any communication path that may enable the transport of electronic data between two entities such as computer systems or modules. The actual physical representation of a communication path between two entities is not important and may change over time. A logical communication path may include portions of a system bus, a local area network, a wide area network, the Internet, combinations thereof, or portions of any other path that may facilitate the transport of electronic data. Logical communication paths may include hardwired links, wireless links, or a combination of hardwired links and wireless links. Logical communication paths may also include software or hardware modules that condition or format portions of data so as to make them accessible to components that implement the principles of the present invention. Such components may include, for example, proxies, routers, firewalls, or gateways. Logical communication paths may also include portions of a Virtual Private Network ("VPN").

In accordance with the present invention, consumer modules and provider modules, as well as associated program data, including network service configuration information, may be stored and accessed from any of the computer-readable media associated with telephonic device 100. For example, portions of such modules and portions of associated program data may be included in operating system 113, application programs 114, program modules 115 and/or program data 116, for storage in memory 112. Portions of such modules and associated program data may also be stored in any of the mass storage devices previously described. Execution of such modules may be performed in a distributed environment as previously described.

Figure 2:
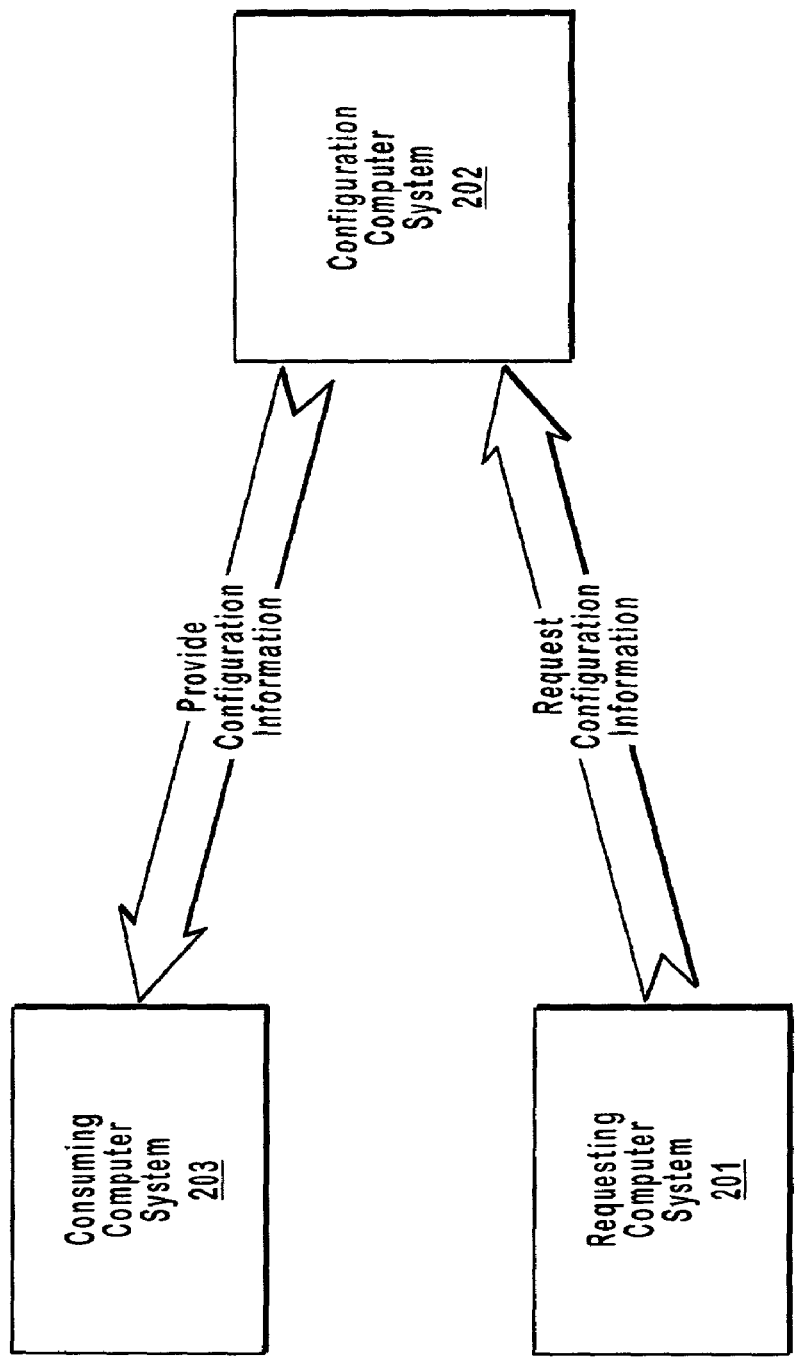
FIG. 2 illustrates an example of some of the functional components that may facilitate increased automation when requesting or providing network service configuration information.

FIG. 2 illustrates some of the functional components that may be used to facilitate increased automation when configuring modules that consume network services. Shown in FIG. 2 are requesting computer system 201, configuration computer system 202 and consuming computer system 203. Each of the computer systems illustrated in FIG. 2 may be a general-purpose computer system that includes components similar to those previously discussed. The computer systems included in FIG. 2 may provide complex and flexible general-purpose computer processing capabilities.

Configuration computer system 202 may contain configuration information used to facilitate the configuration of modules that consume network services. Such network services may include, for example, electronic mail, news groups, or Web services. However, network services are not limited to the present examples. It would be apparent to one skilled in the art, after having reviewed this description, that a wide variety of network services may be offered by a network.

Configuration computer system 202 may contain configuration information for network services provided by service providers. This configuration information may be contained in a searchable table or database that is included in configuration computer system 202. In addition to managing configuration information for services provided by a service provider, the configuration computer system 202 may be the actual service provider itself. In this latter case, the configuration computer system 202 contains configuration information for services it provides.

In operation, requesting computer system 201 sends a request for configuration information that is received by configuration computer system 202. The arrow labeled "Request Configuration Information" is illustrated as originating at requesting computer system 201 and terminating at configuration computer system 202. This merely illustrates that the request is sent from requesting computer system 201 and is received at configuration computer system 202. However, a request may not travel directly between requesting computer system 201 and configuration computer system 202.

A request may pass through one or more other remote computer systems (or other systems or devices) before the request is received at configuration computer system 202. A remote computer system may be a computer system similar to configuration computer system 202 and may or may not contain configuration information for network services. It may be that a request is initially received at one or more remote computer systems that do not contain the appropriate configuration information to satisfy a request. Thus, after a request is sent by requesting computer system 201, the request may be redirected through one or more remote computer systems. The request may eventually be received at configuration computer system 202 after being redirected from a remote computer system.

In response to receiving a request, configuration computer system 202 automatically provides configuration information to consuming computer system 203. The arrow labeled "Provide Configuration Information" illustrates that configuration information is sent from configuration computer system 202 to consuming computer system 203. Configuration computer system 202 may provide configuration information for services provided by configuration computer system 202 or for other service providers. Providing configuration information may include searching for and identifying configuration information. If configuration computer system 202 includes a table or database of configuration information for service provides, the table or database may be searched to identify configuration information.

In some embodiments, requesting computer system 201 and consuming computer system 203 may be the same computer system. That is, requesting computer system 201 may request configuration information for modules included in requesting computer system 201. In these embodiments, configuration computer system 202 would automatically provide configuration information to requesting computer system 201. For example, the requesting computer system 201 and the consuming computer system 203 may be a single telephonic device such as the telephonic device 100 illustrated in FIG. 1.

In some embodiments, accessing an identifier may facilitate sending a request. Accessing an identifier may include retrieving information that was previously stored in a mass storage device or system memory associated with a requesting computer system. Accessing an identifier may also include retrieving information that was entered in response to prompting a user to enter information, for example, in response to a prompt to enter an electronic mail address. In some cases, retrieved information may be utilized as the identifier without need of any modification.

In other cases, the retrieved information may be modified to generate an identifier. An identifier may be generated from the text of an electronic mail address by using only a portion of the text of the electronic mail address. For example, the electronic mail address "jdoe@test.com", may be converted to the identifier, "test.com". This may be especially beneficial in an environment where configuration settings for network services are associated with an electronic mail domain.

In some embodiments, combinations of stored and entered information may be retrieved to facilitate access to an identifier. The stored and/or entered information may be manipulated to generate an identifier. It may be that an address associated with a configuration computer system is stored in a requesting computer system. This stored address may be combined with information entered by a user in response to a prompt for an electronic mail address. The requesting computer system may then access the generated identifier to send a request.

Combining an address to a configuration computer system and portions of an electronic mail address may facilitate generation of a Uniform Resource Identifier ("URI"). A generated URI may be in the form of a Uniform Resource Locator ("URL") that is used to access data on the World Wide Web ("Web"). Assume that the text string "serverl.com" represents a server address and that the text string "mdoe@test1.com" represents an electronic mail address. These text strings may be a manipulated to generate the URL "http://serverl.com?e-mail=mdoe@test1.com". The computer system may then utilize the generated URL to facilitate access to the server associated with the address serverl.com. The server, serverl.com, may be accessed via the Hypertext Transfer Protocol ("HTTP").

Accessing an identifier may also include pushing, or otherwise sending an identifier to a server, without the server requesting the identifier. It should be understood that the above-mentioned embodiments for accessing identifiers are merely examples. It would be apparent to one skilled in the art, after having reviewed this description, that a computer system may access an identifier in a wide variety of manners.

Figure 3:
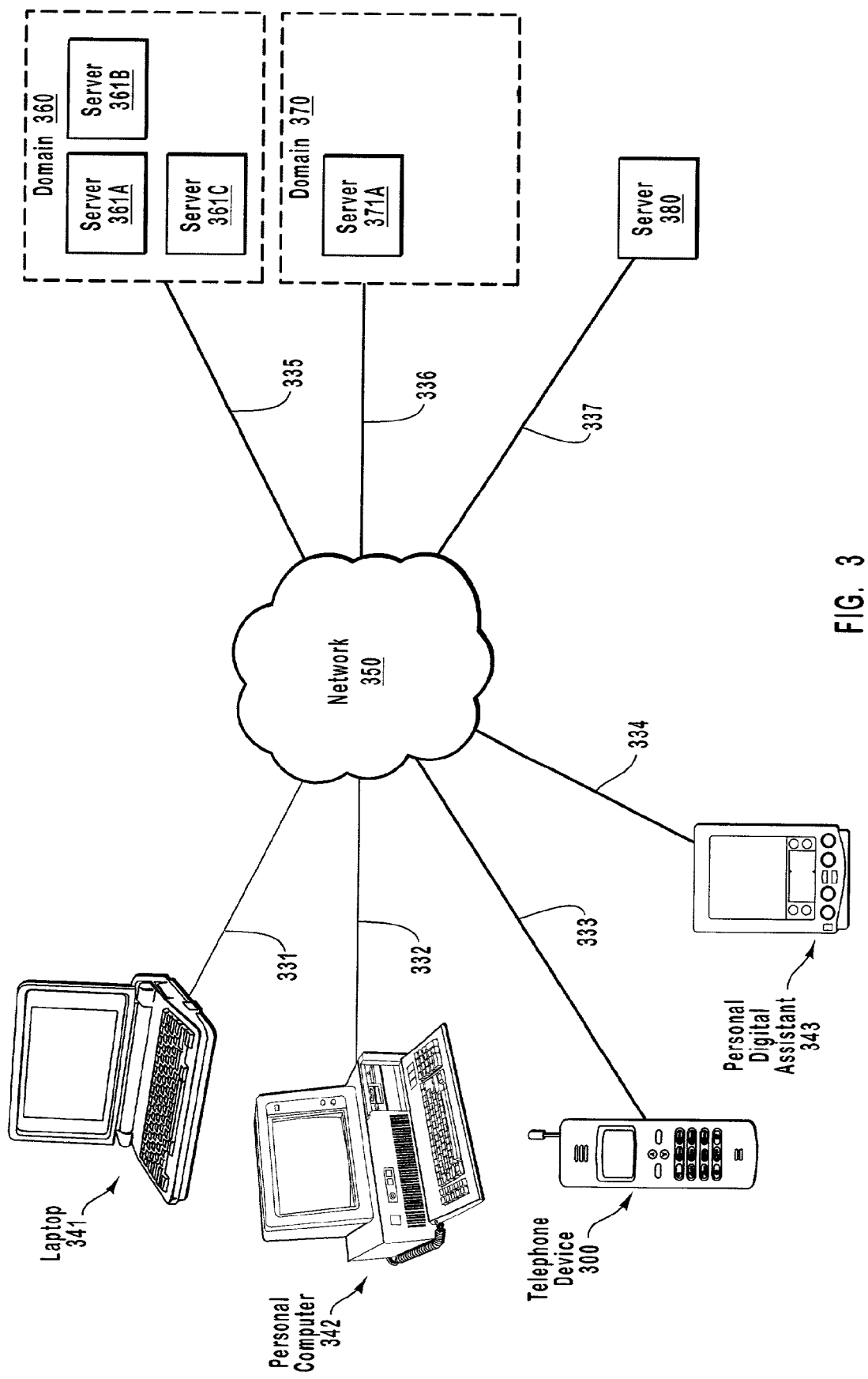
FIG. 3 illustrates an example of a network environment that provides a suitable operating environment for the present invention.
Figure 4:
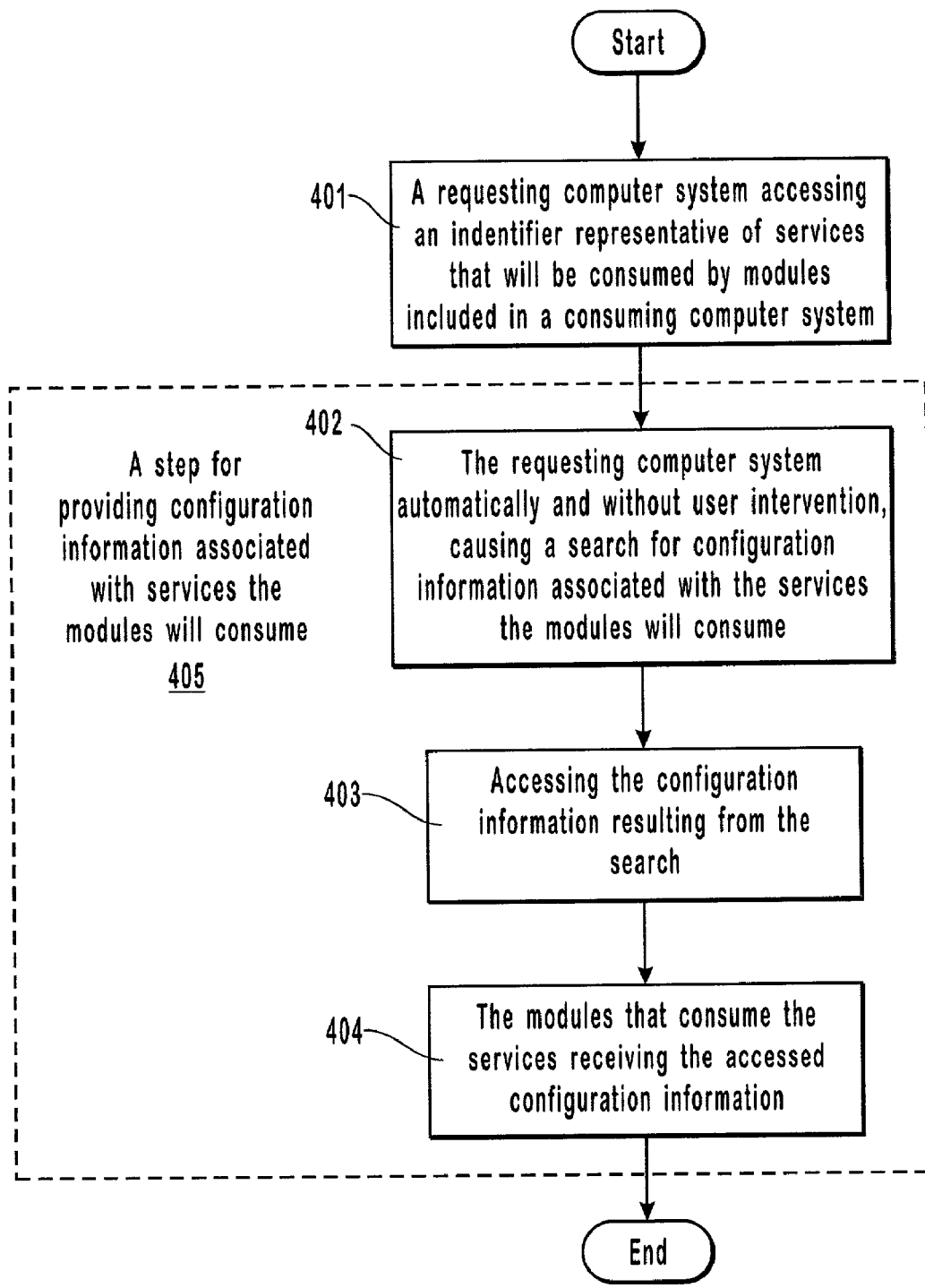
FIG. 4 is a flow diagram illustrating an example of a method for receiving configuration information at modules that consume network services.

FIG. 3 illustrates an example of a network environment that provides a suitable operating environment for the present invention. Shown in FIG. 4 is a flow diagram illustrating a method for providing configuration information to modules that consume network services. The method in FIG. 4 will be discussed with reference to the functional components included in FIGS. 2 and 3.

Illustrated in FIG. 3, logical communication paths 331 through 337 may be used to transport data between the functional components in FIG. 3 and network 350. Network 350 may include portions of a local area network, a wide area network, the Internet, other networks that facilitate the transport of electronic data, or combinations thereof. The logical communication paths 331 through 337 facilitate communication between the functional components in FIG. 3.

In FIG. 4, a requesting computer system accesses an identifier representative of services that will be consumed by modules included in a consuming computer system (act 401). A representative identifier is an identifier that may be used to facilitate access to configuration information for network services. Telephonic device 300 may be viewed as a consuming computer system, and may include consumer modules that consume network services provided by domain 360 and/or domain 370 and/or server 380. A representative identifier for telephonic device 300 would facilitate access to configuration information for network services provided by domain 360 and/or domain 370 and/or server 380.

An identifier may be a representative identifier because a configuration computer system that receives the identifier is aware of which configuration information will be consumed by a consuming computer system. Assume that server 380 is a configuration computer system and that laptop 341 is a consuming computer system. Server 380 may receive a request to send configuration information to laptop 341 in the form of the identifier "test1.com". Server 380 may be aware that the identifier test1.com represents the test1.com electronic mail domain. Thus, server 380 may send configuration information to laptop 341 to configure laptop 141 for operation in the test1.com electronic mail domain.

The method in FIG. 4 may include a step for providing configuration information associated with services the modules in a computer system will consume (step 405). In some embodiments this may include a requesting computer system automatically, and without user intervention, causing a search for configuration information associated with services the modules will consume (act 402). Such a search may be caused by a configuration computer system receiving an identifier. A configuration computer system that receives an identifier may also be the configuration computer system that will provide the consumable network services. In such cases, the configuration computer system would search for configuration information associated with itself. For example, if server 380 was a configuration computer system it may receive an identifier that is representative of network services provided by server 380. Server 380 would then search for network service configuration information to configure consumer modules for operation with server 380.

In some embodiments, a configuration computer system may include a table that contains network service configuration information for one or more other service providers. A received identifier may cause the table to be searched for network service configuration information. If server 380 was a configuration computer system, it may include a table that contains network service configuration information for servers 361A, 361B, 361C, and 371A. Laptop 341 may include a consumer module that consumes electronic mail services from server 361B. Server 380 may receive an identifier from laptop 341 that represents the electronic mail services provided by server 361B. Receiving the identifier may cause server 380 to search the table for network service configuration information associated with server 361B.

In some embodiments, an identifier received at a first configuration computer system may be redirected to a second configuration computer system that contains configuration information associated with network services. Thus, receiving an identifier at a first configuration computer system may cause a search at a second configuration computer system. The second configuration computer system may search for configuration information in accordance with previously mentioned methods.

In an electronic mail environment, an electronic mail domain may include a plurality of servers. This is illustrated in FIG. 3 by domain 360, which includes servers 361A, 361B and 361C. Telephonic device 300 may be a consumer computer system, which includes consumer modules that will consume electronic mail services provided by domain 360. Assume that telephonic device 300 sends the identifier "tsmith@domain360.com" to domain 360. Server 361A may initially receive the identifier and redirect the identifier to server 361C because electronic mail for the user associated with the identifier tsmith@domain360.com is to be physically stored at server 361C. This may cause a search for configuration information contained in server 361C.

It may be that one or more configuration computer systems are unaware of network service configuration information contained in other configuration computer systems. Thus, an identifier may be redirected through a series of configuration computer systems until a server that contains appropriate configuration information is found. In these embodiments, the search may include finding a configuration computer system that contains configuration information associated with network services that will be consumed. Once an appropriate configuration computer system is found, the appropriate configuration computer system may be searched in accordance with the previously discussed methods.

Step 405 may also include an act of accessing configuration information resulting from the search (act 403). Accessing configuration information may include receiving configuration information at a consuming computer system. If the consuming computer system and the requesting computer system are the same computer system, configuration information may be received at the requesting computer system. That is, the requesting computer system may have accessed an identifier representative of services that will be consumed by consumer modules included in the requesting computer system.

However, it may also be that a requesting computer system accesses an identifier that is representative of services consumed by consumer modules that are separate from the requesting computer system. This may occur when the requesting computer system and the consuming computer system are different computer systems. In these embodiments, accessing configuration information may include the consuming computer system receiving configuration information that was requested by the requesting computer system. For example in FIG. 3, personal computer 342 may be a requesting computer system at a wireless carrier service provider. Telephonic device 300 may be a consuming computer system that is associated with the wireless carrier service provider. Personal computer 342 may access an identifier that results in telephonic device 300 receiving configuration information for network services provided by the wireless carrier service provider.

Step 405 may also include an act of modules that consume services receiving the accessed configuration information (act 404). This may include transporting configuration information along a system bus to modules included in memory. For example, configuration information accessed by telephonic device 300 may be transported along a system bus similar to bus 110 and received by consumer modules included in memory similar to memory 112. In some embodiments, receiving configuration information may include transport across a network or transport across one or more logical communication paths. For example, laptop 341 may receive configuration information that is transported across network 350 and logical communication path 331.

Using identifiers to facilitate the reception of configuration information is beneficial. Using identifiers facilitates requests for configuration information that do not require a user to have detailed technical expertise related to the configuration information. Using identifiers also reduces the amount of configuration information that must be manually entered to correctly configure consumer modules. Both of these factors reduce the chance of human error during the configuration process, which in turn results in an increased probability that consumer modules are properly configured.

Figure 5:
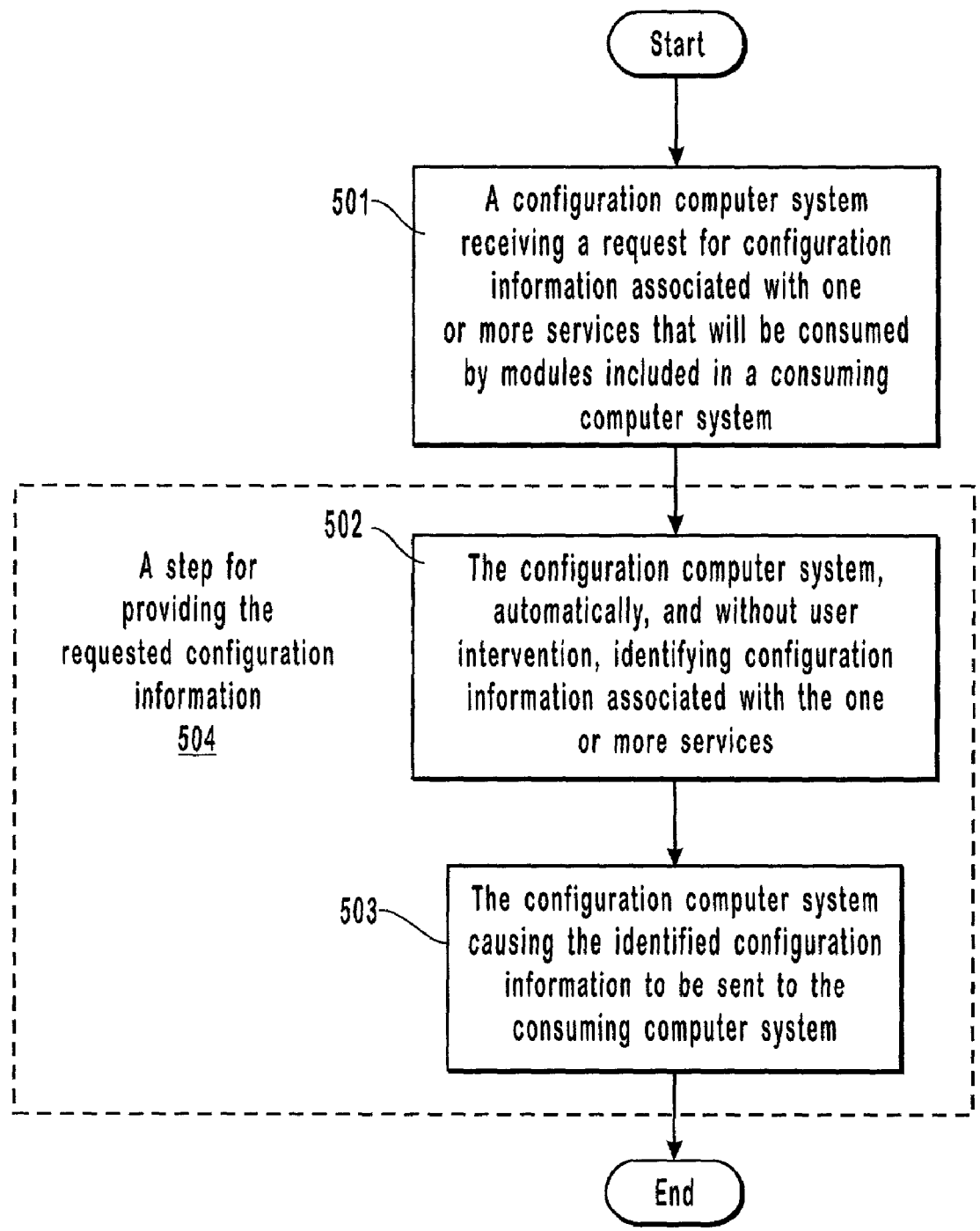
FIG. 5 is a flow diagram illustrating an example of a method for sending configuration information to modules that consume network services.

Shown in FIG. 5 is a flow diagram illustrating a method for sending configuration information to consumer modules. The method in FIG. 5 will be discussed with reference to the functional components included in FIGS. 2 and 3

The method in FIG. 5 may include a configuration computer system receiving a request for configuration information associated with one or more services (act 501). The request may be for configuration information associated with services that will be consumed by consumer modules included in a consuming computer system. Receiving a request may include receiving an identifier that is associated with the one or more network services. For example, server 371A may receive an identifier representative of a request for one or more network services associated with domain 370. Services associated with domain 370 may include, for example, electronic mail, news groups, or Web access.

In some embodiments, a configuration computer system may receive a request from a requesting computer system for configuration information to configure consumer modules included in the requesting computer system. For example server 380 may receive a request from PDA 343 for configuration information to configure consumer modules included in PDA 343. In other embodiments, a configuration computer system may receive a request from a requesting computer system for configuration information to configure consumer modules included in a consuming computer system. For example, server 380 may receive a request from personal computer 342 for configuration information to configure modules included in telephonic device 300. It yet other embodiments, a configuration computer system may receive a request that was redirected from a remote computer system. For example, server 361A may receive a request that was redirected from server 380. Server 380 may have redirected the request because it did not contain the requested configuration information.

The method in FIG. 5 may include a step for providing requested configuration information (step 504). This may include an act of a configuration computer system, automatically, and without user intervention, causing identification of configuration information associated with the one or more services (act 502). A configuration computer system may identify configuration information associated with one or more services it provides. For example, server 380 may provide configuration information associated with one or more services provided by server 380. However, it may be that a configuration computer system contains configuration information for network services provided by one or more other service providers. In these cases, a configuration computer system may identify configuration information associated with one or more services provided by the other external service providers.

In some embodiments, a configuration computer system may contain configuration information associated with one or more services in the form of a table. A table may include configuration information for service providers that are external to the configuration computer system. When a request is received from a requesting computer system, the configuration computer system may search the table to identify configuration information for network services provided by the external service providers.

Identifying configuration information for one or more services may also include redirecting a request from a first configuration computer system to a second configuration computer system. This may include redirecting portions of a request to different configuration computer systems that contain configuration information for various services. For example, server 380 may identify that it contains electronic mail configuration information, while server 371A contains news group configuration information. As such, server 380 will redirect a portion of a request to server 371A when both electronic mail configuration information and news group configuration information are included in a request. Likewise, a first configuration computer system may redirect portions of a request to multiple configuration computer systems. For example, server 380 may redirect a portion of a request to server 371A for news group configuration information and a portion of a request to server 361A for electronic mail configuration information.

Identification of configuration information may also include identification of configuration information that is associated with a logical entity, for example, an electronic mail domain. In these embodiments, a configuration computer system may contain configuration parameters for a logical entity, as well as multiple remote computer systems that are included in the logical entity. For example, server 361A may contain configuration information for domain 360, server 361A, 361B, and 361C. Server 361A may identify configuration information that causes consumer modules to receive electronic mail from domain 360 even though the electronic mail is physically stored on server 361C.

Act 502 may be described with reference to computer-executable instructions. An example of computer-executable instructions for identifying configuration information associated with one or more services will be described with reference to a routine developed in the Extensible Markup Language ("XML"). The following description is illustrative only. It would be apparent to one skilled in the art, after having reviewed this description, that a wide variety of programming languages and techniques may be used to implement computer-executable instructions for identifying configuration information associated with one or more services. The routine illustrates computer-executable instructions that utilize an electronic mail address to identify configuration information associated with an electronic mail domain. When a sole period is encountered on three consecutive lines, this represents that some instructions may precede the illustrated routine or that some instructions may follow the illustrated routine. Numbers enclosed in brackets are line numbers and are included for informational purposes to aid in clarifying the description of the instructions.

included for other types of network services, such as news groups and web access. Such instructions may also include one or more subelements.

At line 02 the subelement "parm" includes the attributes "name" and "value". These attributes may refer to an registry key in a system registry that references a location where configuration information may be stored. The attribute values "CONNECTIONID" and "{436EF144-B4FB-4863-A041-8F905A}" may associate the attribute values of other attributes included in the group of instructions with the registry key. Thus, configuration information included in the group of instructions may be stored and accessed later by consumer modules that may have requested the configuration information.

At line 03 the subelement "characteristic" includes the attribute "type" that has an attribute value of "SMTP". The subelement at line 03 includes other subelements represented by the instructions at lines 04 through 08. The subelement at line 04 is closed at line 09 by the "</characteristic>" instruction. In this group of instructions, line 04 defines that the subelements at lines 04 through 08 will be associated with the Simple Mail Transfer Protocol ("SMTP"). The subelements at lines 04 through 08 include configuration information that may be used to configure a consumer module to consume electronic mail resources associated with SMTP.

The attribute values of the subelement at line 04 illustrate an address to a server associated with the transfer of SMTP electronic mail. This indicates that electronic mail may be sent to the electronic mail server "smtp.test1.email.com".

The attribute values of the subelement at line 05 illustrate that a name associated with the transfer of SMTP electronic mail will have a blank value. This may indicate that a previously set default value will not be overwritten. For example, when the identifier "msmith@test.com" is

```
[01]    <characteristic type="EMAIL">
[02]      <parm name="CONNECTIONID" value="{436EF144-B4FB-4863-A041-8F905A}"/>
[03]      <characteristic type="SMTP">
[04]        <parm name="PXADDR" value="{smtp.test1.email.com}"/>
[05]        <parm name="NAME" value=""/>
[06]        <parm name="AUTHNAME" value="%2"/>
[07]        <parm name="DOMAIN" value=""/>
[08]        <parm name="REPLYADDR" value="%1"/>
[09]      </characteristic>
[10]      <characteristic type="POP3">
[11]        <parm name="PXADDR" value="{pop3.test2.email.com}"/>
[12]      </characteristic>
[13]    </characteristic>
```

At line 01 in the preceding group of instructions the element "characteristic" includes the attribute "type" that has an attribute value of "EMAIL". The element at line 01 also includes subelements represented by the instructions at lines 02 through 12. The element at line 01 is closed at line 13 by the "</characteristic>" instruction. In this group of instructions, line 01 defines that the subelements at lines 02 through 12 will be associated with an electronic mail domain. Other instructions similar to line 01 may be received, the "msmith" portion of the identifier may be stored in a variable. Setting the value of the "value" attribute to a blank at line 05 may indicate that the stored value for a name is to be used.

The attribute values of the subelement at line 06 illustrates that an authorization name is set equal to the value of the variable "%2". The value of %2 may previously have been set and/or may be a portion of an identifier that was received at a local computer system. For example, if a local computer system received an identifier that included the portion "msmith@test.com", the value of %2 may previously have been set to equal "msmith".

The attribute values of the subelement at line 07 illustrate that a domain associated with the transfer of SMTP electronic mail will have a blank value. This may indicate that a previously set default value will not be overwritten. For example, when the identifier "msmith@test.com" is received, the "test.com" portion of the identifier may be stored in a variable. Setting the value of the "value" attribute to blank at line 07 may indicate that the stored value for the electronic mail domain is to be used. This may be indicative of a single server domain such as domain 170, where electronic mail messages are not redirected between physical locations within a domain.

The attribute values of the subelement at line 08 illustrates that a reply address is set equal to the value of the variable "%1". The value of %1 may previously have been set and/or may be a portion of an identifier that was received at a local computer system. For example, if a local computer system received an identifier that included the portion "msmith@test.com", the value of %1 may previously have been set to equal "msmith@test.com". This may indicate an electronic mail address that is used when replying to electronic mail messages.

At line 10 the subelement "characteristic" includes the attribute "type" that has an attribute value of "POP3". The subelement at line 03 includes another subelement represented by the instructions at line 11. The subelement at line 10 is closed at line 12 by the "</characteristic>" instruction. In this group of instructions, line 10 defines that the subelement at line 11 will be associated with the Post Office Protocol ("POP"). The subelement at line 11 includes configuration information that may be used to configure a consumer module to consume electronic mail resources associated with POP.

The attribute values of the subelement at line 11 illustrate an address to a server associated with the transfer of POP electronic mail. This address indicates that electronic mail may be retrieved from the electronic mail server "pop3.test2.email.com".

Step 504 may also include a configuration computer system causing the identified configuration information to be sent (act 503). This may include a configuration computer system sending configuration information to a requesting computer system or a consuming computer system. Configuration information may be sent via a system bus, a logical communication path, a network, or combinations thereof.

Automatically identifying network service configuration information is beneficial. Automatic identification reduces the technical expertise that is required to retrieve configuration information and configure consumer modules. Automatic identification also reduces the amount of configuration information that is manually entered when configuring consumer modules. This reduces the chances of human error when configuring such modules and, in turn, increases the chance that such modules will be configured properly.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a requesting computer system that is in network communication with a configuration computer system, a method for automatically causing configuration information at the configuration computer system and that is associated with email services of an email service provider to be received at one or more consumer modules that will consume the email services, and in a manner that reduces the amount of configuration information manually entered by a user of the email services, the method comprising the following:

an act of the requesting computer system accessing an identifier comprising at least a portion of an email address, and such that the identifier corresponds to email services of an email service provider that the one or more consumer modules will consume;

an act of the requesting computer system, automatically, and without user intervention, causing a search for configuration information associated with the email services represented by the identifier, wherein the act of causing the search includes automatically, and without user intervention, sending the identifier comprising said at least a portion of the email address to a configuration computer system which responsively uses the identifier to identify configuration information that is associated with configuration information at the configuration computer system and that is made available to the requesting computer system;

an act of accessing the configuration information resulting from the search; and an act of providing the accessed configuration information to the one or more consumer modules, and thereby enabling the one or more consumer modules to utilize the email services of the email service provider.

2. The method as recited in claim 1, wherein the act of the requesting computer system accessing an identifier comprises the following:

an act of the requesting computer system parsing a complete email to obtain a partial email address as the at least a portion of an email address.

3. The method as recited in claim 2, wherein the partial email address is a domain portion of an mail address.

4. The method as recited in claim 1, wherein the act of the requesting computer system accessing an identifier comprises the following:

an act of generating a Uniform Resource Identifier that includes the at least a portion of an mail address, the Uniform Resource Identifier being representative of email services the one or more consumer modules will consume.

5. The method as recited in claim 4, wherein the act of generating a Uniform Resource Identifier comprises the following:

an act of generating a Uniform Resource Identifier that includes an mail domain portion of an mail address.

6. The method as recited in claim 1, wherein the act of the requesting computer system accessing an identifier comprises the following:

an act of generating a Uniform Resource Identifier that includes an address, which is representative of a configuration computer system that includes the configuration information associated with the email services the one or more consumer modules will consume.

7. The method as recited in claim 1, wherein the act of the requesting computer system accessing an identifier comprises the following:

an act of the requesting computer system accessing an identifier that was hard coded into a module included in the requesting computer system.

8. The method as recited in claim 1, wherein the act of the requesting computer system accessing an identifier comprises the following:
an act of the requesting computer system accessing an identifier that was entered by a user of the one or more consumer modules.

9. The method as recited in claim 1, further comprising the following:
an act of the requesting computer system accessing an identifier representative of news group services the one or more consumer modules will consume.

10. The method as recited in claim 1, further comprising the following:
an act of the requesting computer system accessing an identifier representative of Web services the one or more consumer modules will consume.

11. The method as recited in claim 1, wherein the act of the requesting computer system, automatically, and without user intervention, causing a search for configuration information associated with the email services represented by the comprises the following:
an act of a first configuration computer system receiving an identifier that was redirected from a second configuration computer system.

12. The method as recited in claim 1, wherein the act of the requesting computer system, automatically, and without user intervention, causing a search for configuration information associated with the email services represented by the identifier comprises the following:
an act of causing the configuration computer system to search for configuration information associated with the email services the one or more consumer modules will consume.

13. The method as recited in claim 12, wherein the act of causing the configuration computer system to search for configuration information associated with the email services the one or more consumer modules will consume comprises the following:
an act of causing the configuration computer system to search a table of configuration information for information associated with the email services the one or more consumer modules will consume.

14. The method as recited in claim 12, wherein the act of causing the configuration computer system to search for configuration information associated with the email services the one or more consumer modules will consume comprises the following:
an act of causing a search for a configuration computer system that contains configuration information associated with the email services the one or more consumer modules will consume.

15. The method as recited in claim 1, wherein the act of accessing the configuration information resulting from the search comprises the following:
an act of accessing configuration information that was coded using XML.

16. The method as recited in claim 1, wherein the act of providing the accessed configuration information to the one or more consumer modules comprises the following:
an act of the one or more consumer modules receiving the accessed configuration information from a configuration computer system that has access to the configuration information.

17. The method as recited in claim 16, wherein the act of the one or more consumer modules receiving configuration information from a configuration computer system that has access to the configuration information comprises the following:
an act of one or more consumer modules included in a consuming computer system receiving configuration information from the configuration computer system.

18. The method as recited in claim 1, wherein the act of providing the accessed configuration information to the one or more consumer modules comprises the following:
an act of the one or more consumer modules receiving the accessed configuration information from a consuming computer system.

19. The method as recited in claim 1, wherein the act of the requesting computer system, automatically, and without user intervention, sending the identifier to a configuration computer system comprises the following:
an act of sending the identifier to the configuration computer system, the configuration computer system being external to the provider of the email services the one or more consumer modules will consume.

20. The method as recited in claim 1, wherein the one or more consumer modules are within a mobile electronic device.

21. The method as recited in claim 20, wherein the mobile electronic device is a telephone.

22. The method as recited in claim 1, wherein the requesting computer system is a distributed system that includes a consuming computer system as part of the distributed system, and wherein the act of accessing the configuration information resulting from the search is performed by the consuming computer system.

23. In a requesting computer system that is in network communication with a configuration computer system, a method for automatically causing configuration information at the configuration computer system and that is associated with email services of an email service provider to be received at one or more consumer modules that will consume the email services in a manner that reduces the amount of configuration information manually entered by a user of the email services, the method comprising the following:
an act of the requesting computer system accessing an identifier comprising at least a portion of an email address, and such that the identifier corresponds to email services of an email service provider that the one or more consumer modules will consume, wherein the one or more consumer modules will consume;
an act of the requesting computer system sending, automatically, and without user intervention, the identifier comprising the at least a portion of the email address to a configuration computer system, which responsively uses the identifier to identify configuration information that is associated with configuration information at the configuration computer system and that is made available to the requesting computer system; and
a step for providing the accessed configuration information to the one or more consumer modules, and thereby enabling the one or more consuming modules to utilize the email services of the email service provider.

24. The method as recited in claim 23, wherein the step for providing the accessed configuration information comprises the following:
an act of a configuration computer system sending configuration information associated with the email services the one or more consumer modules will consume.

25. The method as recited in claim 24, wherein the act of a configuration computer system sending configuration information associated with the email services the one or more consumer modules will consume comprises the following:

an act of the configuration computer system sending configuration information to a consuming computer system.

26. In a configuration computer system that is in network communication with a consuming computer system and which provides configuration information for email services, a method for sending configuration information associated with one or more email services of an email service provider in a manner that reduces the amount of configuration information manually entered by a user, the method comprising the following:

an act of the configuration computer system receiving an automated request for configuration information associated with one or more email services that will be consumed by one or more consumer modules of the consuming computer system, the automated request having been provided without user intervention, the request including an identifier comprising at least a portion of an email address, and such that the identifier corresponds to email services of an email service provider that the one or more consumer modules will consume;

in response to receiving the request, an act of the configuration computer system, automatically, and without user intervention, causing identification of configuration information that is associated with the identifier and with the one or more email services that will be consumed; and an act of the configuration computer system causing the identified configuration information to be sent to the consuming computer system to enable one or more consumer modules to utilize the email services of the email service provider.

27. The method as recited in claim 26, wherein the at least a portion of an email address is a complete electronic mail address.

28. The method as recited in claim 26, wherein the act of the configuration computer system receiving a request for configuration information comprises the following:

an act of the configuration computer system receiving an identifier that is sent from the consuming computer system.

29. The method as recited in claim 26, wherein the act of the configuration computer system receiving a request for configuration information comprises the following:

an act of the configuration computer system becoming aware that a requesting computer system has initiated communication with the configuration computer system in accordance with HTTP.

30. The method as recited in claim 26, wherein the act of the configuration computer system, automatically, and without user intervention, causing identification of configuration information associated with the one or more email services that will be consumed comprises the following:

an act of the configuration computer system causing a search for configuration information associated with one or more email services that will be consumed by using the identifier.

31. The method as recited in claim 30, wherein the act of the configuration computer system causing a search for configuration information comprises the following:

an act of the configuration computer system causing a search for configuration information for email services provided by the configuration computer system, wherein the configuration computer system is also the service provider.

32. The method as recited in claim 30, wherein the act of the configuration computer system causing a search for configuration information comprises the following:

an act of the configuration computer system causing the search of a table that includes configuration information for email services provided by one or more service providers that are external to the configuration computer system.

33. The method as recited in claim 26, wherein the act of the configuration computer system, automatically, and without user intervention, causing identification of configuration information associated with the one or more email services that will be consumed comprises the following:

an act of the configuration computer system causing identification of a remote computer system that contains information associated with one or more email services that will be consumed.

34. The method as recited in claim 33, wherein the act of the configuration computer system causing identification of a remote computer system that contains information associated with one or more email services that will be consumed comprises the following:

an act of the configuration computer system causing identification of a remote computer system that contains information associated with one or more email services that will be consumed by one or more consumer modules in the consuming computer system.

35. The method as recited in claim 26, wherein the act of the configuration computer system, automatically, and without user intervention, causing identification of configuration information associated with the one or more email services that will be consumed comprises the following:

an act of identifying configuration information that was coded using XML.

36. The method as recited in claim 26, wherein the act of the configuration computer system causing the identified configuration information to be sent comprises the following:

an act of the configuration computer system causing configuration information that is associated with the configuration computer system to be sent.

37. The method as recited in claim 26, wherein the act of the configuration computer system causing the identified configuration information to be sent comprises the following:

an act of the configuration computer system redirecting an identifier to a remote computer system that causes identified configuration information to be sent.

38. The method as recited in claim 26, wherein the act of the configuration computer system causing the identified configuration information to be sent comprises the following:

an act of the configuration computer system causing identified configuration information that was contained in the configuration computer system to be sent.

39. The method as recited in claim 38, wherein the act of the configuration computer system causing identified configuration information that was contained in the configuration computer system to be sent comprises the following:

an act of the configuration computer system causing identified configuration information, which was contained in a table included in the configuration computer system, to be sent.

40. The method as recited in claim 26, wherein the act of the configuration computer system causing the identified configuration information to be sent comprises the following:

an act of the configuration computer system causing identified configuration information that was coded in XML to be sent.

41. The method as recited in claim 26, wherein the act of the configuration computer system causing the identified configuration information to be sent comprises the following:

an act of the configuration computer system causing identified configuration information to be sent over a network.

42. The method as recited in claim 26, wherein the act of the configuration computer system causing the identified configuration information to be sent comprises the following:

an act of the configuration computer system causing identified configuration information to be sent over a system bus.

43. A computer program product for implementing, in a requesting computer system that is in network communication with a configuration computer system, a method for automatically causing configuration information at the configuration computer system and that is associated with the email services of an email service provider to be received at one or more consumer modules that will consume the email services, and in a manner that reduces the amount of configuration information manually entered by a user, the computer program product comprising:

one or more physical computer-readable media carrying computer-executable instructions that when executed at the requesting computer system, cause the requesting computer system to perform the method, including:

accessing an identifier comprising at least a portion of an email address, the identifier corresponding to of email services of an email service provider that the one or more consumer modules will consume;

causing a search for configuration information associated with the email services represented by the identifier, wherein the act comprising an act of includes the requesting computer system, automatically, and without user intervention, sending the identifier comprising at least a portion of the email address to a configuration computing system which responsively uses the identifier to identify configuration information that is associated with configuration information at the configuration computing system and that is made available to the requesting computer;

accessing the configuration information resulting from the search; and providing the accessed configuration information to the one or more consumer modules, and thereby enabling the one or more consumer modules to utilize the email services of the email service provider.

44. A computer program product for implementing, in a configuration computer system that is in network communication with a consuming computer system and which provides configuration information for email services, a method for sending configuration information associated with one or more email services of an email service provider in a manner that reduces the amount of configuration information manually entered by a user of the email services, the computer program product comprising:

one or more physical computer-readable media carrying computer-executable instructions that when executed at the configuration computer system, cause the configuration computer system to perform the method, including:

receiving by the configuration computer system an automated request for configuration information associated with one or more email services that will be consumed by one or more consumer modules included in a consuming computer system, the automated request having been provided without user intervention, the request including an identifier comprising at least a portion of an email address, and such that the identifier corresponds to email services of an email service provider that the one or more consumer modules will consume;

in response to receiving the request, automatically, and without user intervention, causing identification of configuration information that is associated with the identifier and with the one or more email services that will be consumed; and causing the identified configuration information to be sent to the consuming computer system to enable one or more consumer modules to utilize the email services of the email service provider.

* * * * *